United States Patent [19]

Murayama et al.

[11] 3,852,429

[45] Dec. 3, 1974

[54] METHOD FOR PRODUCTION OF SHAPED CARBON ARTICLES

[75] Inventors: Naohiro Murayama; Takayuki Katto, both of Iwaki, Japan

[73] Assignee: Kureha Kagaku Kogyo Kabushiki Kaisha, Tokyo-To, Japan

[22] Filed: Apr. 9, 1973

[21] Appl. No.: 349,127

Related U.S. Application Data

[63] Continuation-in-part of Ser. No. 62,210, Aug. 7, 1970.

[52] U.S. Cl.............. 423/449, 423/445, 423/447, 264/29, 252/421, 252/422, 252/425
[51] Int. Cl............................................. B29c 25/00
[58] Field of Search .......... 423/447, 448, 449, 445; 264/29; 252/421, 422, 425

[56] References Cited
UNITED STATES PATENTS
3,258,363  6/1966  Lieb................................. 264/29 X
3,516,791  6/1970  Evans et al. ....................... 423/449

OTHER PUBLICATIONS

Tsuchida et al., "J. Polymer Science," Part A, Vol. 2, pp. 3347–3354.

*Primary Examiner*—Herbert T. Carter
*Attorney, Agent, or Firm*—Wenderoth, Lind & Ponack

[57] ABSTRACT

Shaped carbon articles can be manufactured by first shaping vinylidene fluoride homopolymer or copolymers of vinylidene fluoride and fluorine-containing olefin with vinylidene fluoride as its principal constituent into desired forms, crosslinking the shaped polymer by a chemical reaction to render it infusible, and then carbonizing the same by heat-treatment.

12 Claims, 3 Drawing Figures

FIG. IA
X-RAY DIFFRACTION CURVES OF POLYVINYLIDENE FLUORIDE SHEET BEFORE TREATMENT WITH LIQUID AMMONIA/SODIUM SYSTEM
(Cu-K ray
(Ni filter
(35 kV
(15 mA
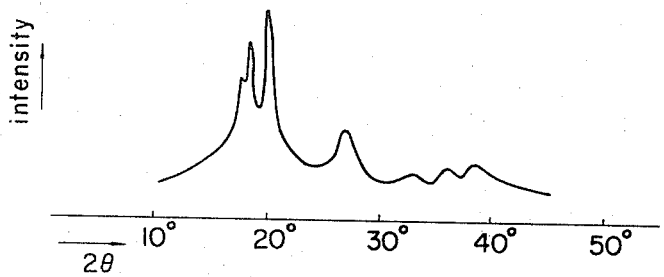
FIG. IB
X-RAY DIFFRACTION CURVES OF POLYVINYLIDENE FLUORIDE SHEET AFTER TREATMENT WITH LIQUID AMMONIA/SODIUM SYSTEM
(Cu-K ray
(Ni filter
(35 kV
(15 mA
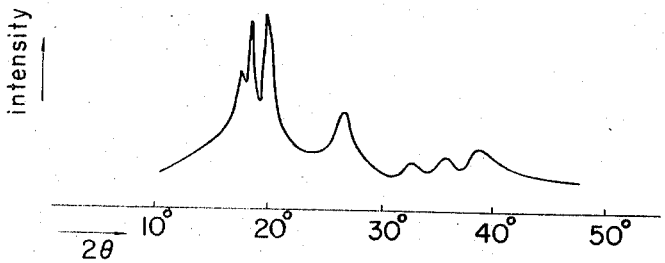

X-RAY DIFFRACTION CURVE OF POLYVINYLIDENE FLUORIDE SHEET AS TREATED WITH LIQUID AMMONIA/SODIUM SYSTEM FOLLOWED BY CARBONIZATION UNDER HEAT AT AN ELEVATED TEMPERATURE OF 500°C (Cu-K ray
(Ni filter
(37 kV
(17 mA

METHOD FOR PRODUCTION OF SHAPED CARBON ARTICLES

REFERENCE TO THE RELATED APPLICATION

This is a continuation-in-part application of the copending application No. 62,210, filed Aug. 7, 1970 for "Method for Production of Shaped Carbon Articles."

BACKGROUND OF THE INVENTION

The present invention relates to a method for producing carbonaceous articles from vinylidene fluoride homopolymer or copolymers containing therein vinylidene fluoride as the principal constituent (these are hereinafter referred to as "vinylidene fluoride polymer") without accompanying deformation in the original shape thereof during the treatment.

SUMMARY OF THE INVENTION

It is an object of the present invention to provide a method for producing carbonaceous articles of predetermined shape without accompanying extreme deformation in the shaped product due to melting, in which the vinylidene fluoride polymer is first shaped into a desired form, then the shaped polymer is pretreated for cross-linking by a chemical reaction at a temperature below the melting point of the polymer to render it infusible, then the infusibilized article is heat-treated at an appropriate temperature to expel hydrogen fluoride from it, and finally it is carbonized, or further graphitized, if necessary.

The abovementioned object as well as the principle of the present invention will be more readily understandable from the following detailed description of the invention and preferred embodiments thereof, when read in conjunction with the accompanying drawing.

BRIEF DESCRIPTION OF THE DRAWING

In the drawing:
FIGS. 1A, 1B, and 2 indicate the X-ray diffraction curves of shaped body of vinylidene fluoride homopolymer treated in accordance with the present invention.

DETAILED DESCRIPTION OF THE INVENTION

Figure 2:
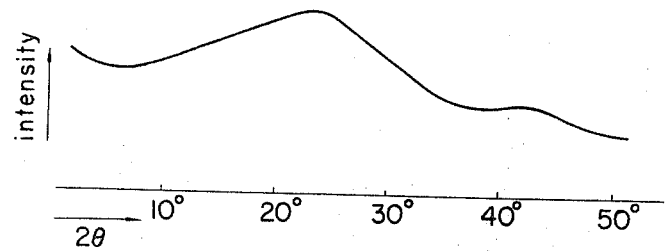

In general, when carbonaceous substance is to be produced by pyrolysis of thermoplastic polymers, if the softening or melting point of the polymer is lower than the decomposition temperature thereof, the shaped product of the polymer easily deforms or often tends to be porous due to gases generated from the heat-treatment. Consequently, it is extremely difficult to obtain shaped carbon articles from thermoplastic polymers retaining their original shape.

Vinylidene fluoride polymer is a thermoplastic high polymer substance, which can be carbonized by expelling hydrogen fluoride therefrom (dehydrofluorination) through pyrolysis of vinylidene fluoride polymer or a chemical reaction.

Unlike polyvinyl chloride and polyvinylidene chloride, vinylidene fluoride polymer is extremely stable against heat at its melting point, so that it is difficult to attain the dehydrofluorination under heat which is below the melting point thereof.

In the case of the pyrolysis, the vinylidene fluoride polymer attains dehydrofluorination and is carbonized at a temperature of from 300° to 500°C. At this temperature range, vinylidene fluoride polymer is generally in a molten state, since crystal melting of the polymer takes place at less than 180°C, on account of which the polymer completely loses its shape, and moreover, foams are produced therein due to generated gas, whereby it turns into carbonaceous product having very low apparent specific gravity, metallic lustre, and high hardness.

Even when dehydrofluorination is carried out in the molten state of the polymer at its initial stage, if it is desired to carbonize the same without losing its original shape, the polymer product must be heated for a very long period of time under extremely slow condition of the dehydrofluorination, which is almost impractical from the standpoint of industrialized mass production.

The carbonization due to dehydrofluorination in accordance with the chemical reaction can be effected by a nucleophilic reagent, but in the case of carbonizing the shaped article of vinylidene fluoride polymer, there has already occurred deformation or loss in the original shape thereof due to surface exfoliation, cracks, etc. which take place at the stage, wherein the residual quantity of fluorine in the polymer is fairly large during proceeding of the dehydrofluorination reaction.

As the method for carbonizing polymers using a chemical reagent, there have been known one, in which polyvinylidene chloride or polyvinylidene fluoride is carbonized by causing it to dehydrofluorinate with use of alkali amide in liquid ammonia (U.S. Pat. No. 3,516,791), and another, in which polyvinyl chloride or polyvinylidene chloride is subjected to dehydrofluorination by using dispersion of alkali amide in liquid ammonia (Tsuchida et al., Journal of Polymer Science, Part A, Vol. 2, pp. 3347–3354 (1961)).

However, as in the former example, when the shaped article of vinylidene fluoride polymer is to be carbonized by use of alkali amide in liquid ammonia, if the dehydrofluorination reaction proceeds to a considerable degree, there tends to occur the surface exfoliation of the shaped article due to non-uniformity of the reaction at the surface part of the shaped article and in the interior thereof, or, even if care is taken to carry out the uniform dehydrofluorination reaction between the surface and the interior parts of the shaped article, the article is broken into pieces prior to its attaining the carbonization. As the result of this, this known method is not applicable to the case of the present invention, which is directed to the carbonization of the shaped article of polymers with its original shape being maintained, even though the carbonization per se is possible.

The latter example is to subject the polyvinyl chloride shaped article to dehydrofluorination by treating it with dispersion of alkali amide in liquid ammonia with the polymer being dissolved in a solvent. This method is also inapplicable to the carbonization of the polymer shaped article, while maintaining its original shape, as in the present invention.

The present invention consists in carbonization of shaped articles of vinylidene fluoride polymers by a heat-treatment, wherein, prior to effecting carbonization by such heat-treatment, the shaped articles are subjected to a preliminary treatment at a temperature below the melting point of the polymer so as to expel hydrogen fluoride from the polymer and to cause the cross-linking reaction to take place among the molecules constituting the polymer shaped articles, whereby the shaped articles of vinylidene fluoride polymer becomes insoluble and infusibilized. This pretreatment is, therefore, to provide the carbon shaped articles having no deformation in their original shape due to melting of the polymer shaped articles at the time of the carbonization under heat, for, with only the heat-treatment for carbonization, the vinylidene fluoride polymer readily melts to deform the original shape of the articles.

Here, the term "vinylidene fluoride polymer" designates polyvinylidene fluoride itself, or a mixture or copolymer of vinylidene fluoride and a fluorine-containing olefin monomer such as tetrafluoroethylene, chloro-trifluoro-ethylene, hexafluoropropylene, fluoro-chloro-vinylidene, vinyl fluoride, and so forth.

The term "shaped article" used herein includes various shapes of the products such as filaments, thin films, plates, tubes, spheres, rods, and any other complex configurations.

In the case of a vinylidene fluoride copolymer, the compound possesses remarkable characteristics such that it can be more readily insolubilized and infusibilized by the abovementioned pretreatment than in the case of a vinylidene fluoride homopolymer.

It is also possible to add beforehand to the vinylidene fluoride polymer shaped article a chemically stable inactive substances such as, for example, carbon, graphite, nickel, etc., or a substance which accelerates the dehydrofluroination reaction of the vinylidene fluoride polymer such as, for example, glass powder, etc..

The dehydrofluorination reaction to take place in the preliminary treatment accompanying the cross-linking reaction can be effected by use of a nucleophilic reagent. The cross-linking of vinylidene fluoride polymer having a definite shape should preferably be as uniform as possible. If non-uniformity takes place in the cross-linking reaction, the product is in some case deformed or broken down during the reaction or at the time of pyrolytic treatment after the reaction. In order therefore to secure uniform proceeding of the reaction, it is necessary to adjust the reaction temperature and time along with selection of an appropriate reagent in accordance with kind of the material polymer as well as the shape of the product. Further, it is preferred that the dispersion speed of the reagent into the polymer interior be faster than the reaction speed. For instance, in the case of thin filament and film, segregation of the reagent due to dispersion into the polymer is too small to become a problem, hence it is possible to treat the material with a relatively strong reagent at a high temperature lower than the melting point of the polymer material. However, in the case of reacting the reagent with the polymer product such as thick plate, the reaction tends to proceed more easily at the surface part of the product than at the inner part thereof with the consequence that there appears a remarkable tendency of the degree of cross-linking being different between the surface and the inner parts of the plate. It is therefore necessary that the reaction be carried out with a relatively weak reagent at a lower temperature for a longer period of time by selecting such reaction conditions that the dispersion speed of the reagent into the polymer interior is sufficiently faster than the reaction speed.

There are various substances for such nucleophilic reagent. Among others, ammonia, liquid ammonia-sodium system, ethylenediamine, n-butylamine, and di-n-butylamine are particularly effective.

The reaction speed can also be quickened by causing the shaped article of vinylidene fluoride polymer to swell slightly with an appropriately selected solvent, and then to react the same with the abovementioned nucleophilic reagent.

By the preliminary treatment with these nucleophilic reagent, the shaped articles of vinylidene fluoride polymer becomes blackened to be insoluble and infusible.

Further, as the vinylidene fluoride polymer has a large polarity in general, use of the reagent having an equally large polarity is considered advantageous. For this purpose, ammonia and liquid ammonia-sodium system belong to those reagents that quickly disperse into the polymer and expel hydrogen fluoride from the shaped articles of vinylidene fluoride polymer to a surprisingly uniform degree to cross-link the polymer shaped articles.

The degree of the preliminary treatment using the nucleophilic reagent according to the present invention can be such that the shaped articles of vinylidene fluoride polymer becomes insoluble and infusible and the original shape of the article does not deform at the time of carbonization due to the heat-treatment. The degree of dehydrofluorination can also be small.

When the amount of dehydrofluorination due to this preliminary treatment becomes excessive, the shaped articles will be deprived of their original shape in the course of the preliminary treatment or at the time of carbonization due to heating. Take the shaped articles of vinylidene fluoride polymer, for example. The degree of the preliminary treatment due to the liquid ammonia-sodium system should desirably be such that the fluorine content in the polymer shaped article after the preliminary treatment range from 55 to 58.5 percent by weight. Incidentally, the fluorine content in the vinylidene fluoride polymer shaped article prior to the preliminary treatment is 59.3 percent by weight. When the fluorine content of the pretreated polymer shaped article exceeds 58.5 percent by weight, there tends to occur deformation of the article due to its melting at the time of carbonization by heating. On the other hand, when the fluorine content is below 55 percent, there tends to occur surface exfoliation, and other deformations of the polymer shaped article already during the preliminary treatment.

In the same manner, the shaped article of vinylidene fluoride copolymers should preferably have a degree in reduction of the fluorine content (percent by weight) due to the preliminary treatment in a range of from 0.5 to 4.5 percent by weight.

The fact that the degree of dehydrofluorination due to the preliminary treatment in accordance with the present invention is small can be inferred not only from the afore-mentioned analytical value of fluorine, but also from X-ray diffraction curve of the polymer shaped article before and after the preliminary treatment, which varies very slightly, i.e., very slight change in the crystallinity of the polymer shaped articles due to the preliminary treatment. (As is well known, vinylidene fluoride polymers are crystalline and exhibit very sharp peak by the X-ray diffraction).

FIG. 1A indicates the X-ray diffraction curve of polyvinylidene fluoride homopolymer sheet of 1 mm thick and cut into a rectangular form of 3 cm × 6 cm prior to its preliminary treatment. FIG. 1B indicates the X-ray diffraction curve of polyvinylidene fluoride homopolymer sheet of the same dimension as that in FIG. 1A, 17 g (consisting of several sheets) of which were treated for 22 hours at a temperature of 80°C in a stainless steel ampoule of 200 ml capacity with 15 g of metallic sodium in 130 cc of liquid ammonia. FIG. 2 is the X-ray diffraction curve of the pretreated polyvinylidene fluoride sheet which was subjected to carbonization under heat-treatment at an elevated temperature of 500°C.

From comparison of the two curves in FIGS. 1A and 1B, it is seen that lowering in crystallinity of the polyvinylidene fluoride sheet as pretreated is very slight.

Wile the fluorine content in vinylidene fluoride homopolymer is 59.3 percent by weight as aforementioned, the fluorine content of the abovementioned pretreated shaped article was 57.0 percent by weight as the result of analyses.

Thus, at the time of the preliminary treatment, vinylidene fluoride polymer shaped article is slightly deprived of hydrogen fluoride to cause cross-linking, but not carbonized, hence the shaped article does not, of course, assume a porous structure.

The characteristic point of the chemical pretreatment of vinylidene fluoride copolymer with a mixture of ammonia and metallic sodium is that, unlike the pretreatment of vinylidene fluoride homopolymer with the mixture of ammonia and metallic sodium, the reaction proceeds uniformly at a relatively low temperature as in the vicinity of a room temperature, and the reaction time may be shorter than that for vinylidene fluoride homopolymer. For example, when a plate of vinylidene fluoride homopolymer of 1 mm thickness is to be chemically treated with a mixture of ammonia and metallic sodium, the reaction should be carried out at a temperature of 50° to 90°C for about 50 hours. On the other hand, however, 1 mm plate of vinylidene fluoride/tetrafluoroethylene copolymer, the charging rate of the respective monomers being 80 and 20, can be treated for the required uniform cross-linking at 30°C for 20 hours or so.

By heat-treating the thus infusibilized vinylidene fluoride polymer in an inactive atmosphere at an elevated temperature of 300° to 500°C, it can be deprived of hydrogen fluoride contained therein, whereby a carbon product having predetermined uniform shape, high hardness, and large chemical stability is obtained. The manner of heating the polymer product should preferably be done by gradually raising the heating temperature for the final carbon product of uniform quality. Also, the heat-treating temperature may be between 300° and 500°C as mentioned above when the shaped article is to be simply deprived of hydrogen fluoride and carbonized. It is further permissible that the shaped article can be heated at a higher temperature exceeding 500°C for the purpose of changing the adsorption characteristic and electrical characteristic of the resulting carbon shaped article. The temperature appropriate for this purpose is selected from 500° to 3,000°C. The raising of the heat-treating temperature should preferably be carried out in a gradual manner for obtaining the product of uniform quality.

The carbon article thus obtained characteristically possesses extremely low electrical resistance, even when it is heat-treated at a lower temperature than that for manufacturing other carbon products. For instance, even if the carbon product is heat-treated at 400° to 800°C, its electrical resistance ranges from $10^5$ to $10^{-2}$ ohm-cm or so. It is therefore easy to obtain carbon product having very wide range of resistance value by adjusting the heat-treatment temperature or composition of copolymer material. The carbon that constitutes such carbon product is the so-called hard carbon which is extremely hard and possesses excellent anti-chemical property.

The carbon shaped article of the present invention possesses the selective adsorption characteristic of molecules and is capable of producing any desired shape of product. Further, the carbon product according to the present invention possesses better selective adsorption characteristic of molecules than that obtained by a simple heat-treatment, some of which are possibly useful as molecular sieves whose selectivity varies with the heat-treatment temperature. The pores of the carbon product from vinylidene fluoride homopolymer are of such size that permits passage of flat molecules as those of benzene as well as molecules of a diameter of n-pentane or the like, but makes it difficult to cause large-sized molecules of cyclohexane, isopentane, or neo-pentane, or the like. In the case of copolymers, its selectivity varies in accordance with the size of pores which depends on the heat-treatment temperature, the mixing ratio of monomers, etc. Moreover, the size of the pores can be varied by the kind of copolymers, or mixing ratio of the respective monomers constituting the copolymers, or the heat-treatment temperature, time, etc., whereby it is possible to produce the carbon article having pores which allow molecules of cyclohexane and isopentane to pass therethrough.

The heat-treatment temperature can be selected within the range of from the decomposition temperature of the polymer to that at which graphitization of the carbon product from the polymer has proceeded to some extent (approximately 3,000°C). However, from the standpoint of selectivity as well as the adsorption quantity with respect to isomers of pentane, or the like, the maximum temperature for the heat-treatment should preferably be in the range of from 400° to 1,400°C.

The carbonaceous product thus obtained is highly useful, in its predetermined, desired form, for various industrial products which make use of the electrical characteristic and/or characteristics derived from voids the treated material possesses, or for the carbon products in general. For example, it can be utilized as a selective membrane for gas dispersion and separation, in which its pore structure and chemical resistant properties can be taken advantage of. Also, in the manufacture of electrical resistance, products of uniform quality can be obtained.

PREFERRED EMBODIMENTS OF THE INVENTION

In order to enable persons skilled in the art to reduce the present invention into practice, the following preferred examples are presented. It should, however, be noted that these examples are not limitative to the scope of the present invention as recited in the appended claims.

In each of the examples, the adsorption quantity with respect to the adsorptibility of each specimen is a value at the extrapolated point toward the zero pressure on the straight line portion on a graph, in which the quantities of adsorption per gram of the specimen in the vicinity of the boiling point of the adsorptive substance as measured by varying pressure are plotted.

EXAMPLE 1

Vinylidene fluoride homopolymer obtained by suspension-polymerization was press-formed into a circular disc of 1 mm thick and 25 mm in diameter. About 10 g of this disc was placed in a stainless steel autoclave of 300 cc capacity together with 10 g of metallic sodium. After the autoclave was made vacuum, 100 cc of ammonia ($NH_3$) was charged thereinto. The autoclave was maintained in shaking for 24 hours at 60°C, thereafter 1 part by weight of ethanol was added to the content after ammonia is purged to cause it to react with unreacted sodium, sodium amide, etc. After this reaction, the reacted product was rinsed with water. Further, the reacted product was treated for 3 hours in boiling water, and then dried in a dryer at a temperature of 130°C.

The disc thus pretreated assumed black in color and did not almost change its original shape. Upon heating, it was not fused, and was insoluble in any kind of solvents that dissolve vinylidene fluoride homopolymer. Moreover, it did not substantially swell and expand in such solvent. The fluorine content in this article was 58 percent.

Next, this polymer disc was placed in a vessel made of nickel and was heated in a nitrogen atmosphere for 5 hours at 400°C to cause hydrogen fluoride to be expelled therefrom. Thereafter, the temperature was raised to 500°C and when cooled. As the result of this, a carbonaceous article having substantially same dimension as its original one (i.e., 0.95 mm thick and 23.5 mm in diameter) and having black metallic lustre was obtained. The electrical resistance of this article was approximately $10^2$ ohm-cm, and its specific gravity was 1.05.

The following Table 1 indicates the adsorption characteristics of the carbonaceous article.

Table 1

|  | Adsorption Temp (°C) | Adsorption Q'ty (mg/g) |
|---|---|---|
| n-pentane | 38.5 | 171 |
| iso-pentane | 30.5 | 158 |
| neo-pentane | 11.5 | 69 |

The selective adsorption can be apparently recognized from the above Table.

EXAMPLE 2

The circular disc of vinylidene fluoride homopolymer treated in the same manner as in Example 1 was first heat-treated in nitrogen atmosphere by elevating the temperature to 390°C at a rate of rise of about 50°C per hour and maintained at this temperature for 10 hours, then it was raised to 500°C at a rise rate of 100°C per hour and maintained at this temperature for 2 hours, and the temperature was further increased to 800°C at a rise rate of 100°C per hour, at which the disc was kept for 3 hours, after which it was left to cool. A carbonaceous article having substantially same dimension as its original one (0.90 mm thick and 21 mm in diameter) and having black metallic lustre and high hardness was obtained.

The properties of the carbonaceous article were as follows.

| | |
|---|---|
| a. Electrical resistance | : approx. 2 ohm-cm |
| b. Specific gravity | : 1.195 |
| c. Acid resistance | : Tested for 7 days in a mixture solution of conc. sulfuric acid ($H_2SO_4$) and conc. nitric acid ($HNO_3$). No change occurred in outer appearance and strength. |
| d. Adsorption characteristics | : see Table 2 below. |

Table 2

|  | Adsorption Temperature (°C) | Adsorption Quantity (mg/g) |
|---|---|---|
| n-pentane | 38.5 | 167 |
| iso-pentane | 30.5 | 153 |
| neo-pentane | 11.5 | 2 |
| benzene | 81.0 | 173 |
| cyclohexane | 81.0 | 46 |

From the above Table, it can be seen that the carbon article exhibits almost perfect selectivity to neo-pentane, and also to cyclohexane, though imperfect in its degree.

The same article was further heat-treated in nitrogen gas by raising the heating temperature to 1,000°C at a rise rate of 100°C/hour, at which temperature it was maintained for 2 hours, the adsorption characteristics of which are as follows.

Table 3

|  | Adsorption Temperature (°C) | Adsorption Quantity (mg/g) |
|---|---|---|
| n-pentane | 38.5 | 119 |
| iso-pentane | 30.5 | 63 |
| benzene | 81.0 | 118 |
| cyclohexane | 81.0 | 26 |

The size of the pores became smaller by the heat-treatment, which contributed to increase in the selectivity between n-pentane and iso-pentane as well as between benzene and cyclohexane.

EXAMPLE 3

Filament of 30 microns in diameter was drawn from vinylidene fluoride homopolymer, and treated in ethylendiamine at 70°C for 30 min., thereby obtaining black filament. This filament was sufficiently rinsed and dried at 80°C for 2 hours, after which it was again heat-treated in argon gas current by elevating the temperature to 500°C at a rise rate of 50°C per hour, at which it was kept for 10 minutes. Thereafter, it was gradually cooled to obtain carbonized filament of 25 microns in diameter. The tensile strength as well as rate of stretch of this carbonized filament were respectively $10^6$ g/cm and 3 percent.

EXAMPLE 4

A rod of 1 cm × 1 cm × 5 cm made of vinylidene fluoride homopolymer and 5 g of metallic sodium were charged into a stainless steel autoclave of 300 cc capacity together with 50 cc of $NH_3$, and the batch was reacted at a temperature of 65°C for 48 hours. Upon completion of the reaction, a large quantity of ethanol was added to the reaction system to treat the unreacted substance, after which it was rinsed, treated in boiling water of 100°C for 5 hours, and then was dried at 120°C. The rod thus treated, when cut in its cross-section, showed that, except for its surface part, its inner part was uniformly cross-linked and blackened, and the entire part thereof was perfectly infusibilized and insolubilized.

This pretreated rod was further subjected to pyrolysis in a nickel container with nitrogen gas current at a temperature of 390°C for 15 hours, and was further treated at 500°C for 3 hours. A carbonaceous article of substantially same dimension as the original could be obtained.

EXAMPLE 5

A film of 0.1 mm thick was treated in the same manner as in Example 4 above, whereby a flexible carbonized film was obtained.

EXAMPLE 6

A copolymer obtained by suspension-polymerization of 90 parts by weight of vinylidene fluoride and 10 parts by weight of tetrafluoroethylene was press-formed into a plate of 1 mm thick, from which discs of 25 mm in dia. were cut out.

Approximately 20 g in total of the discs and 10 g of metallic sodium were charged into a stainless steel autoclave of 200 cc capacity. The autoclave was made vacuum, when 100 cc of liquid ammonia was introduced thereinto.

This autoclave was maintained in shaking at 30°C for 20 hours, after which it was further kept shaking at 20°C for 20 hours. Thereafter, ammonia was discharged and the residual sodium was completely reacted with a large quantity of ethanol. Then, it was rinsed well, and again washed in boiling water for about 3 hours, and finally dried.

From this pretreatment, insolubilized and infusibilized black discs retaining their original shapes were obtained.

Next, these pretreated discs were placed in a platinum crucible, and the temperature was raised up to 400°C in 2 hours in a nitrogen atmosphere, at which temperature the discs were maintained for 3 hours, and then left to cool in the air.

Further, a part of these discs was heat-treated in a nitrogen atmosphere by raising the temperature thereof to 600°C in 3 hours, at which the disc was maintained for another 3 hours, and then was left to cool. In both cases, a hard, black carbonaceous product having substantially same as in its original shape was obtained. The dimensions of the discs treated at 400°C were 0.95 mm in thick and 24.2 mm in diameter. The electrical resistance of the products were as follows.

a. Product treated at 400°C ..... $5.5 \times 10^4$ ohm-cm b. Product treated at 600°C ..... $1.1 \times 10^1$ ohm-cm

EXAMPLE 7

A copolymer obtained by suspension-polymerization of 95 parts by weight of vinylidene fluoride and 5 parts by weight of tetrafluoroethylene was press-formed into circular discs in the same manner as in Example 1, which was then treated with a mixture of ammonia and sodium in exactly same quantity and method as in Example 1. The black, infusibilized discs were heat-treated in a platinum crucible by elevating the heating temperature to 400°C in 2 hours in a nitrogen atmosphere, at which temperature the discs were maintained for 3 hours, thereafter they were left to cool in the air.

Further, a part of the treated discs was placed in the Tammann electric furnace, and, by elevating the furnace temperature to 1,300°C in 30 minutes in argon atmosphere, it was maintained at this temperature for 2 hours, and then cooled. In either case, carbonaceous product of substantially same size as in the original thereof was obtained. The adsorption characteristics of this product are as follows. The adsorption quantity is a value in mg/g of the carbonaceous product adsorbed to 1 g of adsorptive substance, when the pressure of the adsorptive substance was kept at about 100 mm Hg for one hour. The temperature for the adsorption test are as follows.

| n-pentane | 38.5°C |
| iso-pentane | 30.5°C |
| neo-pentane | 11.5°C |

Table 4

| Adsorptive Substance | Treated at 400°C | Adsorption Quantity Treated at 800°C | Treated at 1300°C |
| --- | --- | --- | --- |
| n-pentane | 111 | 222 | 176 |
| iso-pentane | 94.1 | 213 | 138 |
| neo-pentane | 58.4 | 159 | 45.9 |

EXAMPLE 8

A copolymer obtained by suspension-polymerization of 90 parts by weight of vinylidene fluoride and 10 parts by weight of chlorotrifluoroethylene was formed into a plate of 1 mm thick, from which a rectangle of 3 cm × 5 cm was made. This rectangle was treated with a mixture of ammonia and sodium ($NH_3$-Na) in the same manner as in the foregoing examples. The reaction was conducted at a room temperature for 20 hours with 8 g of polymer plate of the above-mentioned size, 4 g of sodium and 50 cc of ammonia ($NH_3$).

The liver-colored plate thus resulted was further heat-treated in a platinum crucible by raising the heating temperature to 500°C in 4 hours in a nitrogen atmosphere, at which temperature the plate was maintained for 3 successive hours. Thereafter, it was left to cool in the air, thereby obtaining a carbonaceous article of substantially same size as that of the original and having black lustre. The carbonaceous product had an electrical resistance of 10 ohm-cm, and the selective adsorption characteristics as follows.

Table 5

| Adsorptive Substance | Adsorption Quantity |
|---|---|
| n-pentane | 97.3 mg/g |
| iso-pentane | 58.6 mg/g |
| neo-pentane | 26.7 mg/g |

(The method of testing the characteristics is same as Example 2 above.)

EXAMPLE 9

A copolymer obtained by suspension-polymerization of 80 parts by weight of vinylidene fluoride and 20 parts by weight of tetrafluoroethylene was formed into circular discs of 1.5 mm thick and 25 mm in diameter. The discs were treated with a mixture of ammonia and sodium in the same manner as in the foregoing examples. The reaction was conducted at a room temperature for 40 hours with 8 g of the polymer discs, 3 g of sodium, and 50 cc of ammonia ($NH_3$).

The thus pretreated discs were further heat-treated in a platinum crucible by raising the heating temperature to 400°C in 2 hours in a nitrogen atmosphere, at which temperature the discs were maintained for 3 hours, and then left to cool in the air. Thereafter, a part of the discs was again heat-treated in a nitrogen atmosphere by raising the heating temperature to 600°C in 3 hours, at which temperature the part of the pretreated discs were maintained for 3 hours, and then they were left to cool in the air. Black-colored discs of substantially same as the original were obtained. The selective adsorption characteristics of the carbonaceous discs were as follows.

Table 6

| Adsorptive Substance | Adsorption Quantity | |
|---|---|---|
| | Treated at 400°C | Treated at 600°C |
| n-pentane | 109 | 146 |
| iso-pentane | 95.3 | 122 |
| neo-pentane | 7.7 | 19.8 |

EXAMPLE 10

A film (0.12 mm thick, 2 cm high, and 0.5 cm wide) of a copolymer obtained by suspension-polymerization of 90 parts by weight of vinylidene fluoride and 10 parts by weight of chloro-trifluoroethylene was treated in di-n-butylamine at a temperature of 80°C for 21 hours, whereby a black-colored reacted product retaining its original shape was obtained.

The pretreated article was further heat-treated by elevating temperature to 350°C in 25 hours in a platinum crucible in a nitrogen atmosphere, and then still raising it to 550°C in 2 hours, after which it was left to cool in the air. A carbonaceous film having substantially same dimension and shape could be obtained.

What we claim is:

1. A method for producing a shaped carbon article from a shaped polymer while retaining the original shape of the shaped polymer, which comprises the steps of:

a. subjecting a shaped body of a polymer material selected from the group consisting of a vinylidene fluoride homopolymer and copolymers thereof, containing vinylidene fluoride as the principal constituent, to a pretreatment with a nucleophilic reagent selected from the group consisting of ammonia, a liquid ammonia-sodium system, ethylene-diamine, n-butylamine, and di-n-butylamine at a temperature of from a room temperature to 90°C for a time period until the fluorine content of the shaped body is reduced by 0.5 to 4.5 percent by weight with respect to the weight of the original polymer shaped body; and b. heat-treating the thus pretreated and infusibilized polymer shaped body in an inactive gas atmosphere by raising the heating temperature to the maximum range of from 300° to 500°C to remove hydrogen fluoride therefrom, thereby producing the carbonized shaped article.

2. A method according to claim 1, in which a vinylidene fluoride homopolymer shaped body is employed as the shaped polymer and ammonia is used as the nucleophilic reagent in the pretreatment, said pretreatment being carried out at a reaction temperature of from 50° to 90°C for a time period of from 20 to 50 hours until the fluorine content of the shaped body is reduced to 55 to 58.5 percent by weight.

3. A method according to claim 1, in which a vinylidene fluoride homopolymer shaped body is employed as the shaped polymer and a liquid ammonia-sodium system is used as the nucleophilic reagent in the pretreatment; said pretreatment is carried out at a temperature of from 50° to 90°C for a time period of from 20 to 50 hours until the fluorine content of the shaped body is reduced to 55 to 58.5 percent by weight.

4. A method according to claim 1, in which a vinylidene fluoride copolymer shaped body is employed as the shaped polymer and ammonia is used as the nucleophilic reagent in the pretreatment; said pretreatment being carried out at a temperature of from a room temperature to 90°C for a time period of from 20 to 50 hours.

5. A method according to claim 1, in which a vinylidene fluoride copolymer shaped body is employed as the shaped polymer and a liquid ammonia-sodium system is used as the nucleophilic reagent in the pretreatment; said pretreatment being carried out at a reaction treatment of from a room temperature to 90°C for a time period of from 20 to 50 hours.

6. A method according to claim 1, in which a vinylidene fluoride homopolymer shaped body is employed as the shaped polymer and ethylene di-amine is used as the nucleophilic reagent in the pretreatment; said pretreatment being carried out at a reaction temperature of from a room temperature to 90°C for a time period of from 20 minutes to 30 hours.

7. A method according to claim 1, in which a vinylidene fluoride homopolymer shaped body is employed as the shaped polymer and n-butylamine is used as the nucleophilic reagent in the pretreatment; said pretreatment being carried out at a reaction temperature of from a room temperature to 90°C for a time period of from 20 minutes to 30 hours.

8. A method according to claim 1, in which a vinylidene fluoride homopolymer shaped body is used as the shaped polymer and di-n-butylamine is used as the nucleophilic reagent in the pretreatment; said pretreatment being carried out at a reaction temperature of from a room temperature to 90°C for a time period of from 20 minutes to 30 hours.

9. A method according to claim 1, in which a vinylidene fluoride copolymer shaped body is employed as the shaped polymer and ethylene di-amine is used as the nucleophilic reagent in the pretreatment; said pretreatment being carried out at a reaction temperature of from a room temperature to 90°C for a time period of from 20 minutes to 30 hours.

10. A method according to claim 1, in which a vinylidene fluoride copolymer shaped body is employed as the shaped polymer and n-butylamine is used as the nucleophilic reagent in the pretreatment;; said pretreatment being carried out at a reaction temperature of from a room temperature to 90°C for a time period of from 20 minutes to 30 hours.

11. A method according to claim 1, in which a vinylidene fluoride copolymer shaped body is employed as the shaped polymer and di-n-butylamine is used as the nucleophilic reagent in the pretreatment; said pretreatment being carried out at a reaction temperature of from a room temperature to 90°C for a time period of from 20 minutes to 30 hours.

12. The method according to claim 1, in which the pretreated shaped body is further heat-treated by raising the temperature to a level between 500° and 3,000°C to vary the electric resistance, adsorption characteristics, and mechanical properties thereof.

* * * * *